United States Patent
Holmes

(10) Patent No.: US 7,128,680 B2
(45) Date of Patent: Oct. 31, 2006

(54) COMPOUND DIFFERENTIAL DUAL POWER PATH TRANSMISSION

(75) Inventor: Alan G. Holmes, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 58 days.

(21) Appl. No.: 10/819,399

(22) Filed: Apr. 7, 2004

(65) Prior Publication Data

US 2005/0227803 A1  Oct. 13, 2005

(51) Int. Cl.
*F16H 3/72* (2006.01)
*F16H 37/06* (2006.01)
*F16H 37/08* (2006.01)
*F16H 37/02* (2006.01)

(52) U.S. Cl. .................. 475/204; 475/5; 475/10; 475/150; 475/201; 475/214

(58) Field of Classification Search .............. 475/5, 475/6, 10, 150, 151, 201, 204, 214, 215, 475/218, 219; 74/331
See application file for complete search history.

(56) References Cited

U.S. PATENT DOCUMENTS

| | | | | |
|---|---|---|---|---|
| 3,580,107 A * | 5/1971 | Orshansky, Jr. | ............... | 475/78 |
| 4,727,764 A * | 3/1988 | Klaue | ............... | 74/331 |
| 5,390,560 A | 2/1995 | Ordo | ............... | 74/329 |
| 5,403,241 A * | 4/1995 | Jarchow et al. | ............... | 475/72 |
| 5,558,589 A * | 9/1996 | Schmidt | ............... | 475/5 |
| 6,010,422 A * | 1/2000 | Garnett et al. | ............... | 475/5 |
| 6,478,705 B1 * | 11/2002 | Holmes et al. | ............... | 475/5 |
| 6,527,658 B1 * | 3/2003 | Holmes et al. | ............... | 475/5 |
| 6,551,208 B1 * | 4/2003 | Holmes et al. | ............... | 475/5 |
| 6,558,283 B1 * | 5/2003 | Schnelle | ............... | 475/5 |
| 6,645,105 B1 * | 11/2003 | Kima | ............... | 475/5 |
| 6,716,126 B1 * | 4/2004 | Bowen | ............... | 475/5 |
| 6,852,054 B1 * | 2/2005 | Tumback et al. | ............... | 475/5 |
| 6,893,373 B1 * | 5/2005 | Kawamoto et al. | ............... | 475/302 |
| 6,945,893 B1 * | 9/2005 | Grillo et al. | ............... | 475/5 |
| 2005/0101425 A1 * | 5/2005 | Yamauchi et al. | ............... | 475/5 |

* cited by examiner

*Primary Examiner*—Tisha Lewis
(74) *Attorney, Agent, or Firm*—Christopher DeVries

(57) ABSTRACT

A vehicle transmission includes a differential gearset having five coaxial gear elements and two output members. Two of the gear elements are controllable via torque-transmitting devices such as friction brakes or electric motors to establish a plurality of speed ratios between the input shaft and the two output members. The two output members are selectively operatively connectable to an output shaft via a gear arrangement that allows for a plurality of speed ratios between the output members and the output shaft. If the torque-transmitting devices are electric motors or hydraulic pumps, then a continuously variable speed ratio between the input shaft and the output shaft is achievable. The plurality of speed ratios between the two output members and the output shaft enable a plurality of compound split operating modes, facilitating smaller and less powerful motors or pumps compared to the prior art.

12 Claims, 2 Drawing Sheets

COMPOUND DIFFERENTIAL DUAL POWER PATH TRANSMISSION

TECHNICAL FIELD

This invention relates to vehicle transmissions having a differential gear set and two output members operatively interconnecting the gear set and an output shaft.

BACKGROUND OF THE INVENTION

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary, and clutches or torque converters that allow smooth transitions between driving ratios to start the vehicle from rest and accelerate to the desired highway speed with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between the engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. However, a series electric drive requires that the electrical machinery be sufficiently sized to transform all engine power from mechanical to electrical form and from electrical to mechanical form, and useful power is lost in this double conversion.

A power split transmission can use what is commonly understood to be a "differential gearing" to achieve a continuously variable torque and speed ratio between input and output without sending all power through the variable elements. An electrically variable transmission can use differential gearing to send a fraction of its transmitted power through a pair of electric motor/generators and the remainder of its power through another, parallel path that is all mechanical and direct, of fixed ratio, or alternatively selectable. One form of differential gearing may constitute a planetary gear subset. In fact, planetary gearing is usually the preferred embodiment employed in differentially geared inventions, with the advantage of compactness and different torque and speed ratios among all members of the planetary gearing subset. However, it is possible to construct this invention without planetary gears, as by using bevel differential gears or other differential gears.

A hybrid electrically variable transmission system for a vehicle also includes an electric storage battery, which allows the mechanical output power to vary from the mechanical input power, engine starting with the transmission system, and regenerative vehicle braking.

An electrically variable transmission in a vehicle can simply transmit mechanical power. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

One of the most successful substitutes for the series hybrid transmission is the variable, two-mode, input-compound-split, parallel-hybrid electric transmission. Such a transmission utilizes an input means to receive power from the vehicle engine and a power output member to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

Operation in a first or second mode may be selectively achieved by using clutches in the nature of torque-transmitting devices. In one mode, the input-split mode, the output speed of the transmission is proportional to the speed of one motor/generator, and in the second mode, the compound-split mode, the output speed of the transmission increases along with the speed of the other motor/generator.

In some embodiments of the variable, two-mode, input-compound-split, parallel-hybrid electric transmission a planetary gear set is selectively employed for torque multiplication. In addition, some embodiments may utilize three torque-transmitting devices—two to select the operational mode desired of the transmission and the third selectively to disconnect the transmission from the engine. In other embodiments, all three torque transfers may be utilized to select the desired operational mode of the transmission.

As those skilled in the art will appreciate, a transmission system using a power split arrangement may receive power from two sources. However, the prior art does not include any practical gear schemes with more than three compound split operating modes.

SUMMARY OF THE INVENTION

A vehicle transmission is provided. The transmission includes a differential gearset having first, second, third, fourth, and fifth gear elements operatively interconnected with one another. An input shaft is operatively connected to the first gear element. A first selectively engageable torque-transmitting device is mounted to a stationary member and is operatively connected to the second gear element. A second selectively engageable torque-transmitting device is mounted to the stationary member and is operatively connected to the third gear element. A first output member is operatively connected to the fourth gear element, and a second output member is operatively connected to the fifth gear element. A third torque-transmitting device is selectively engageable to operatively connect the first output member to an output shaft. Similarly, a fourth torque-transmitting device is selectively engageable to operatively connect the second output member to the output shaft. The gearset is configured such that the rotational speeds of two of the gear elements may be independently established and determine the rotational speeds of the other three gear elements.

The transmission of the invention may operate with fixed ratios, or may be employed with motor/generators as the first and second torque-transmitting devices to provide a large number of compound power split ratio ranges as a continuously variable transmission. The power required from the motor/generators in continuously variable operation is kept to a small fraction of power through the transmission while the ratio spread can be wide. The overall capacity or "corner power" of the motor/generators can also be kept as low as practical differential gearing will allow. Since hydraulic motors or electric motors are relatively expensive and inefficient as compared with gearing, limiting their size will help make the transmission relatively inexpensive and efficient.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
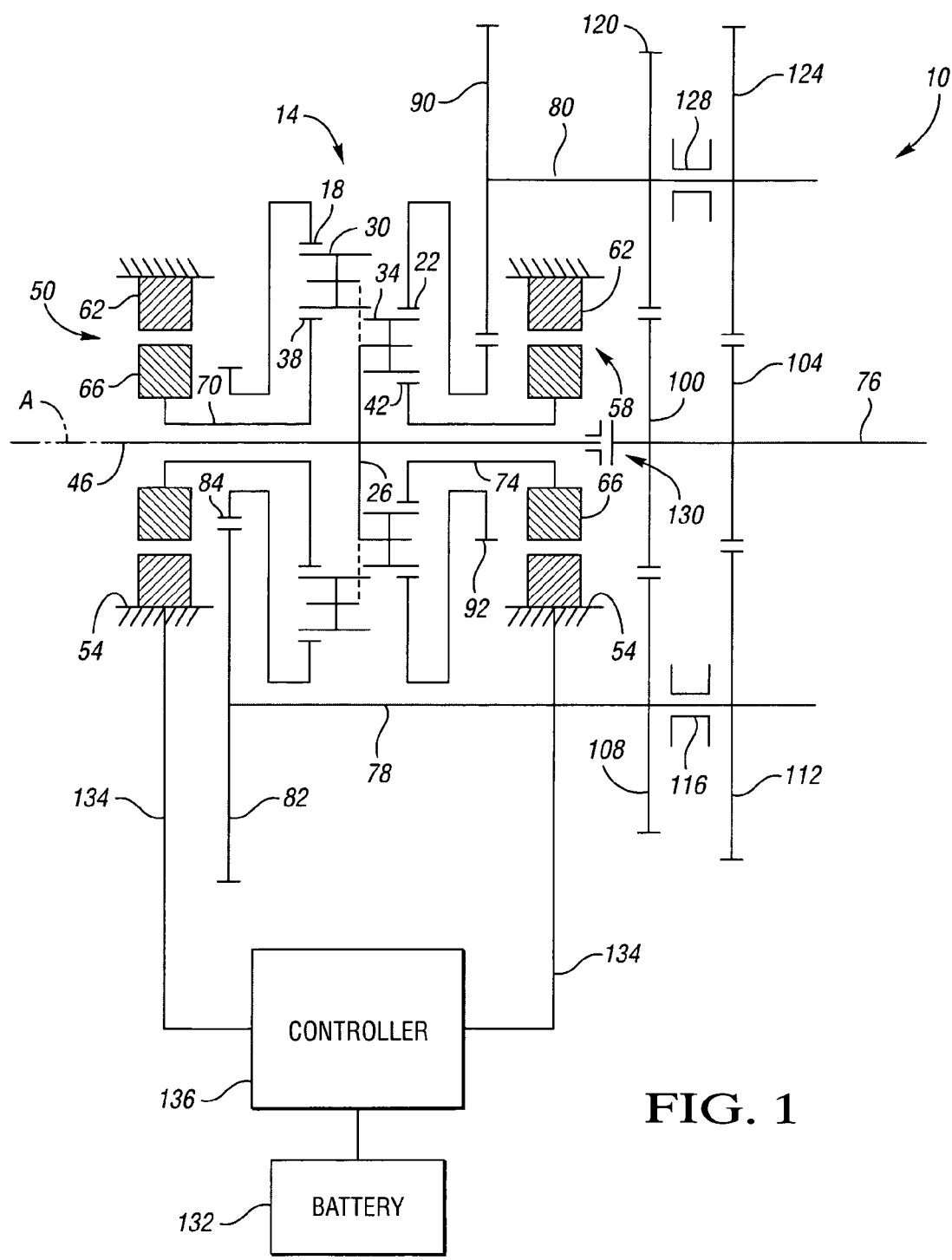
FIG. 1 is a schematic illustration of a vehicle transmission including a differential gearset according to the invention.

Referring to FIG. 1, a vehicular transmission 10 is schematically depicted. The transmission 10 includes a compound differential, Ravineaux gear set 14. The gear set 14 includes a first ring gear member 18, a second ring gear member 22, a planet carrier assembly member 26 including a first set of pinion gears 30 and a second set of pinion gears 34 rotatably mounted thereto, a first sun gear member 38, and a second sun gear member 42. The first sun gear member 38 is meshingly engaged with the first set of pinion gears 30. The second sun gear member 42 is meshingly engaged with the second set of pinion gears 34. The first ring gear member 18 is meshingly engaged with the first set of pinion gears 30, and the second ring gear member 22 is meshingly engaged with the second set of pinion gears 34. The first set of pinion gears 30 is meshingly engaged with the second set of pinion gears 34.

The differential gearset 14 has five members 18, 22, 26, 38, 42 on a common axis A, and is configured so that the speeds of any two of the gear members are capable of being established independently of one another, and the speeds of the other three gear members are dependent on the speeds established for the two gear members. Thus, for example, the rotational speeds of the planetary carrier 26 and the first sun gear 38 may be established independently, and the rotational speeds of the second sun gear 42, the first ring gear 18, and the second ring gear 22 are determined by the speeds of the planetary carrier 26 and the first sun gear 38. Similarly, the rotational speeds of the planetary carrier 26 and the second sun gear 42 may be established independently, and the rotational speeds of the first sun gear 38, the first ring gear 18, and the second ring gear 22 are determined by the speeds of the planetary carrier 26 and the second sun gear 42.

An input shaft 46 is operatively connected to the planet carrier assembly member 26. A first torque-transmitting device 50 operatively interconnects the first sun gear member 38 and a stationary member such as the transmission housing 54. A second torque-transmitting device 58 operatively interconnects the second sun gear member 42 and the transmission housing 54. The first and second torque-transmitting devices 50, 58 may be friction brakes, electric motor/generators, hydraulic motor/pumps, etc., within the scope of the claimed invention. In a preferred embodiment, the torque-transmitting devices 50, 58 are electric motors each having a stator 62 rigidly mounted to the housing 54 and a rotor 66 rigidly affixed to one of the sun gears 38, 42 for rotation therewith. The rotor 66 of the first torque-transmitting device 50 is affixed to sun gear 38 via a sleeve 70 around input shaft 46. The rotor 66 of the second torque-transmitting device 58 is affixed to sun gear 42 via sleeve 74 around input shaft 46.

The transmission 10 includes two output members, namely, a first countershaft 78 and a second countershaft 80, that are operatively connected to the gearset 14 and that define two power paths by which power may flow to an output shaft 76. The first countershaft 78 is operatively connected to the first ring gear 18 so as to be driven thereby. More specifically, the first countershaft is rigidly connected to gear 82, which is meshingly engaged with gear member 84. Gear member 84 is rigidly connected to the first ring gear member 18 for rotation therewith. Similarly, the second countershaft 80 is operatively connected to the second ring gear 22 to be driven thereby. More specifically, the second countershaft 80 is rigidly connected to gear 90, which is meshingly engaged with gear member 92. Gear member 92 is rigidly connected to the second ring gear member 22 for rotation therewith.

Two gear members 100, 104 are connected to the output shaft 76 for rotation therewith. Countershaft 78 has rotatably supported thereon a gear member 108 that is meshingly engaged with gear member 100. Countershaft 78 also has rotatably supported thereon a gear member 112 that is meshingly engaged with gear member 104. A clutch, such as a dog clutch or synchronizer assembly 116, is connected to countershaft 78 and is configured to selectively operatively connect the countershaft 78 to the output shaft 76 via gear 108 or gear 112. More specifically, synchronizer assembly 116 is configured to selectively establish a drive connection between gear 108 and the countershaft 78. Synchronizer assembly 116 is also configured to selectively establish a drive connection between gear 112 and the countershaft 78. Synchronizer assembly 116 is also characterized by a neutral position such that neither gear 108 nor gear 112 is drivingly connected to countershaft 78.

Similarly, countershaft 80 has rotatably supported thereon a gear member 120 that is meshingly engaged with gear member 100. Countershaft 80 also has rotatably supported thereon a gear member 124 that is meshingly engaged with gear member 104. A clutch, such as synchronizer assembly 128, is connected to countershaft 80 and is configured to selectively operatively connect the countershaft 80 to the output shaft 76 via gear 120 or gear 124. More specifically, synchronizer assembly 128 is configured to selectively establish a drive connection between gear 120 and the countershaft 80. Synchronizer assembly 128 is also configured to selectively establish a drive connection between gear 124 and the countershaft 80. Synchronizer assembly 128 is also characterized by a neutral position such that neither gear 120 nor gear 124 is drivingly connected to countershaft 80.

When gear member 108 is drivingly connected to countershaft 78, a first speed ratio is established between countershaft 78 and the output shaft 76. When gear member 112 is drivingly connected to countershaft 78, a second speed ratio is established between countershaft 78 and the output shaft 76. Similarly, when gear member 120 is drivingly connected to countershaft 80, a first speed ratio is established between countershaft 80 and the output shaft 76. When gear member 124 is drivingly connected to countershaft 80, a second speed ratio is established between countershaft 80 and the output shaft 76. It should be noted that the first countershaft 78 and the second countershaft 80 may be operatively connected to the output shaft 76 simultaneously so that both countershafts transmit power to the output shaft.

Thus, the transmission 10 of FIG. 1 is characterized by two fixed gear ratios, such as the first and fifth speed ratios, where power is transmitted to the output shaft by only one of the countershafts. The transmission 10 is also characterized by three fixed gear ratios where both countershafts are operatively connected to the output shaft, such as the second, third, and fourth speed ratios. Input shaft 46 is also selectively engageable directly with output shaft 76 via a direct drive clutch 130 to bypass the countershafts for an additional fixed gear ratio, such as the sixth speed ratio.

The torque-transmitting devices 50, 58 selectively control the rotational speed of the sun gears 38, 42. Different speed ratios between the input shaft 46, the first countershaft 78, and the second countershaft 80 are established through selective engagement of the torque-transmitting devices 50, 58 and corresponding control of sun gear speed. For example, when torque-transmitting device 50 is engaged to prevent sun gear member 38 from rotating, ring gear member 18 and countershaft 78 rotate slower than ring gear member 22 and countershaft 80, respectively, with a constant input shaft speed. When torque-transmitting device 58 prevents sun gear member 42 from rotating, ring gear member 22 and countershaft 80 rotate slower than ring gear member 18 and countershaft 78, respectively, with a constant input shaft speed. Thus, the selective application of torque-transmitting devices 50, 58 establishes a particular set of speed ratios among the elements of the gearset 14 and, correspondingly, a set of speed ratios between countershaft 78 and countershaft 80.

If the torque-transmitting devices 50, 58 are friction brakes, or stationary clutches, shifting of the transmission 10 can be accomplished by disconnecting one of the countershaft gears, disengaging torque-transmitting device 58 while engaging torque-transmitting device 50, and connecting the free countershaft to a gear that is synchronized at the new operating ratio. To shift to the next highest gear, the gear on countershaft 78 is uncoupled from countershaft 78. Torque-transmitting device 50 is engaged while torque-transmitting device 58 is disengaged. The speed of countershaft 78 falls, so the speed of countershaft 78 is less than the speed of countershaft 80. For a fixed output shaft speed, the input shaft speed also decreases. With torque-transmitting device 50 fully engaged, another gear on countershaft 78 with less speed ratio between itself and the output shaft, a "higher gear," can have the necessary ratio to be coupled to countershaft 78, completing an upshift.

For example, the gears on countershafts 78, 80 in use before the shift could have been those with the highest and the second highest ratios with the output shaft. Normally, those would be thought of as "first" and "second" in a dual countershaft or dual layshaft transmission. Instead, the gearset 14 is running countershaft 78 faster and countershaft 80 slower so that both gear members can work together to form the actual "second" gear through the transmission. During the shift, countershaft 80 carries the load through the transmission and stays constant in speed, while countershaft 78 changes speed and gear from what would normally be "first" to "third." After the shift, the gearset 14 is running countershaft 78 slower than countershaft 80 and the input speed is lower, forming the "third" gear through the transmission.

While countershafts 78, 80 are employed as output members in a preferred embodiment, those skilled in the art will recognize a variety of different output member configurations that may be employed within the scope of the invention to form dual power paths from the gearset 14 to an output shaft 76. For example, members of a second planetary gearset may be operatively connected to the first and second ring gears and selectively engageable via clutches to an output shaft. Moreover, those skilled in the art will recognize that it may be desirable to add additional gears to the countershafts and the output shaft to increase the number of speed ratios available between the countershafts and the output shaft.

In a preferred embodiment, the transmission 10 also includes an energy storage device such as battery 132 connected via conductive wires 134 to the motors of torque-transmitting devices 50, 58 to receive power therefrom and to supply power thereto. A controller 136 is operatively connected to the battery and the motors to regulate the flow of power therebetween. Thus, a hybrid transmission is formed. If torque-transmitting devices 50, 58 are hydraulic pumps or electric generators, then they can apply torque indefinitely even if their shafts are rotating. Thus, the shifts described above can be transformed into compound power split operating ranges. That is, the braking torque and speed applied by one of the torque-transmitting devices to spin the gearset element corresponding to one of the countershafts slower than the input can be transformed into power used by the other torque-transmitting device to spin the element corresponding to the other countershaft faster than the input.

When the torque-transmitting devices 50, 58 are motors or include motors, the transmission 10 can be operated as a CVT, by absorbing power with one motor and using it in the other motor. The transmission 10 of FIG. 1 is capable of four continuously variable ranges or modes. Each CVT range or mode is covered as the speed of one torque-transmitting device is decreasing and the speed of the other is increasing. Thus, each CVT mode corresponds to part of the shift of the fixed speed ratio transmission as described above. Transitions between successive modes or ranges occur as the countershaft gearing is selectively engaged and disengaged.

For example, motor 58 might be holding sun gear 42 at zero speed, and countershaft 80 might be carrying the load through the transmission by means of countershaft gear 120 and output gear 100. The speed ratio through the transmission might then be at the "first gear" speed. The other motor 50 would be turning rapidly, and could be generating electrical power to supply the stationary motor 58. To change the transmission speed ratio smoothly and continuously from the "first gear" speed to the "second gear" speed, the speed of the stationary motor 58 would increase smoothly and continuously and the speed of the other motor 50 would decrease smoothly and continuously to zero speed.

Figure 2:
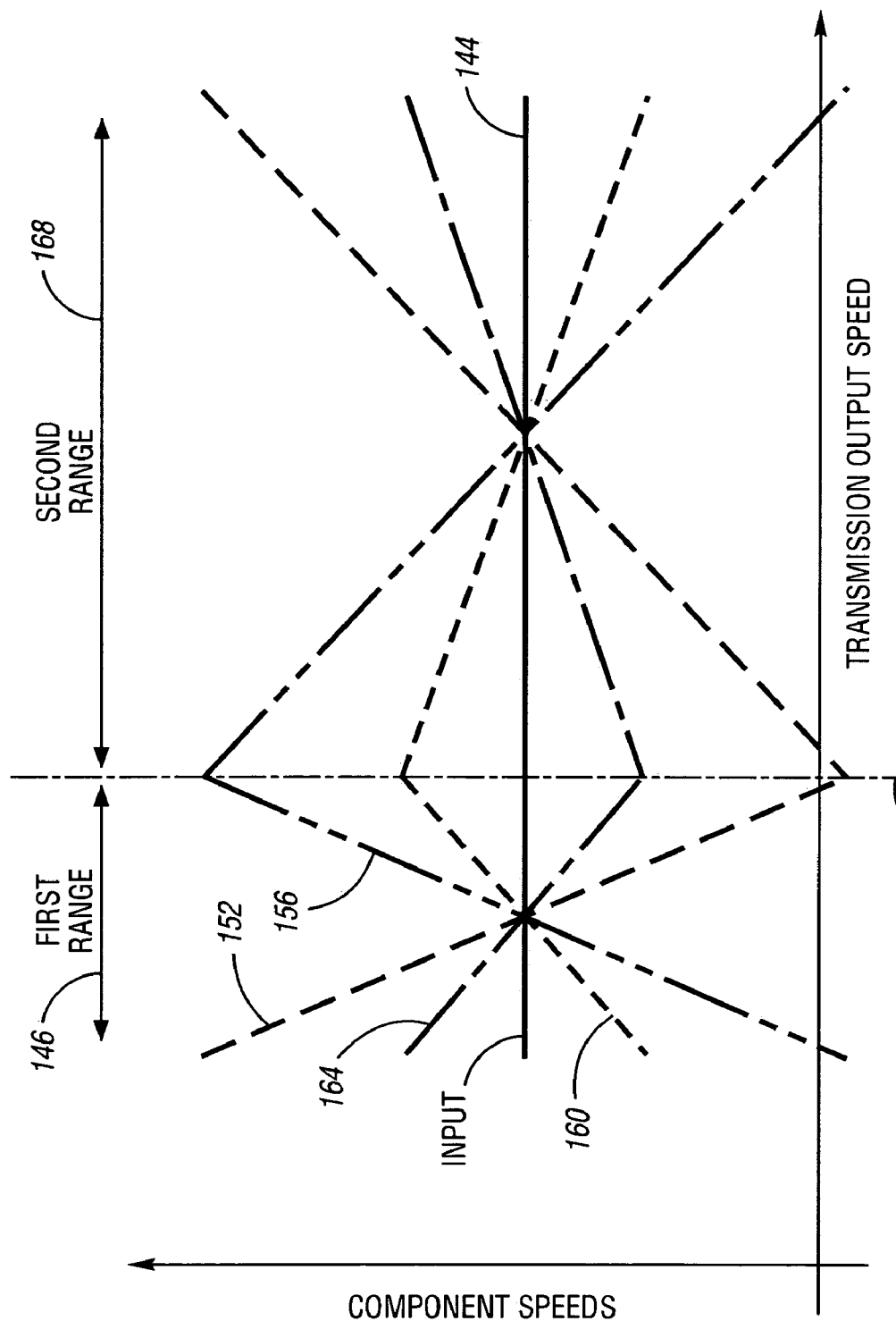
FIG. 2 is a graphical representation of the speeds of the gear elements of the gearset of FIG. 1 in an exemplary operation of the vehicle transmission.

FIG. 2 depicts an exemplary operation of the transmission 10 as a CVT. Rotational speeds of the members of the gearset 14 are depicted with respect to output shaft speed. Thus, reading the graph from left to right represents acceleration in vehicle speed. Referring to FIGS. 1 and 2, the speed of the input shaft 46, and correspondingly the speed of planetary carrier 26, represented by line 144 in FIG. 2, is held constant. In a first range or mode 146 of CVT operation, i.e., prior to a predetermined output shaft speed 148, the controller 136 causes the speed of the first motor 50 and, correspondingly, the speed of the first sun gear 38, represented by line 152 in FIG. 2, to start at a high value and decrease with increasing output shaft speed. Simultaneously, the speed of the second motor 58 and, correspondingly, the speed of the second sun gear 42, represented by line 156, starts at a low value and increases with increasing output shaft speed. The speed of the first ring gear 18, represented by line 160, and, correspondingly, the speed of the first countershaft 78, rises proportionally with the output shaft speed, while the speed of the second ring gear 22, represented by line 164 in FIG. 2, and, correspondingly, the speed of the second countershaft 80, decreases proportionally with the output shaft speed. Synchronizer 116 is engaged to operatively connect gear 108 to the first countershaft 76, so that the transmission output shaft 76 is connected to the first ring gear 18 via the first countershaft 78.

At output shaft speed 148, the transmission is shifted from the first CVT range or mode 146 to a second CVT range or mode 168 by engaging synchronizer 128 to operatively connect gear 120 to the second countershaft 80 and releasing synchronizer 116 to disconnect gear 108 from the first countershaft 78. This change disconnects the first ring gear 18 from the output shaft 76 and connects the second ring gear 22 to the output shaft 76. Thereafter, the speed of the second motor 58 and, correspondingly, the speed of the second sun gear 42, decrease with increasing output shaft speed, while the speed of the first motor 50 and the first sun gear 38 rises. Concurrently, the speed of the first ring 18 gear decreases with increasing output shaft speed, and the speed of the second ring gear 22 and, correspondingly, the speed of the second countershaft 80, rises proportionally with the output shaft speed.

A third range or mode of CVT operation may thereafter be established by disengaging synchronizer 128 to disconnect gear 120 from the second countershaft 80, and by engaging synchronizer 116 to connect gear 112 to the first countershaft. The motor speeds would then behave as in the first range or mode of CVT operation, with the speeds of the first motor 50 and first sun gear 38 descending and the speeds of the second motor and the second sun gear ascending. In like manner, a fourth range or mode of CVT operation may be established subsequent to the third range or mode by releasing gear 112 from the first countershaft 78, operatively connecting gear 124 to the second countershaft 80, and causing the speed of the first motor and first sun gear 38 to ascend with output shaft speed, and causing the speed of the second motor and the second sun gear 42 to descend with increasing output shaft speed.

Thus, the same transmission gearing, compound planetary gearing, and dual countershaft gearing can be useful in both stepped ratio and continuously variable transmissions, and, in fact, a transmission can be constructed to operate effectively in both ways. If the torque-transmitting devices 50, 58 include motors and friction brakes, then the transmission can be operated practically as a stepped ratio transmission, CVT, or combination of the two.

While the best modes for carrying out the invention have been described in detail, those familiar with the art to which this invention relates will recognize various alternative designs and embodiments for practicing the invention within the scope of the appended claims.

What is claimed is:

1. A vehicle transmission comprising:
   a stationary member;
   a differential gearset having first, second, third, fourth, and fifth coaxial gear elements operatively interconnected with one another;
   an input shaft being operatively connected to the first gear element;
   a first selectively engageable torque transmitting device mounted to the stationary member and operatively connected to the second gear element;
   a second selectively engageable torque transmitting device mounted to the stationary member and operatively connected to the third gear element; and
   an output shaft;
   wherein the differential gearset is configured such that the rotational speeds of two of the gear elements may be independently established and determine the rotational speeds of the other three gear elements; and
   wherein the fourth gear element is selectively operatively connectable to the output shaft at at least one speed ratio, and wherein the fifth gear element is selectively operatively connectable to the output shaft at two or more speed ratios.

2. A vehicle transmission comprising:
   a stationary member;
   a differential gearset having first, second, third, fourth, and fifth coaxial gear elements operatively interconnected with one another;
   an input shaft being operatively connected to the first gear element;
   a first selectively engageable torque transmitting device mounted to the stationary member and operatively connected to the second gear element;
   a second selectively engageable torque transmitting device mounted to the stationary member and operatively connected to the third gear element;
   a first output member operatively connected to the fourth gear element;
   a second output member operatively connected to the fifth gear element;
   an output shaft; and
   a third torque transmitting device selectively engageable to operatively connect the first output member to the output shaft; and a fourth torque transmitting device selectively engageable to operatively connect the second output member to the output shaft;
   wherein the gearset is configured such that the rotational speeds of two of the gear elements may be independently established and determine the rotational speeds of the other three gear elements;
   wherein the first output member includes a first countershaft.

3. The transmission of claim 2, wherein the second output member includes a second countershaft.

4. The transmission of claim 3, wherein the speed ratio between the first and second countershafts is selectively variable by selectively engaging the first and second torque transmitting devices to control the rotational speed of the second and third gear elements, respectively.

5. The transmission of claim 4, further comprising a sixth gear element and a seventh gear element operatively connected to the output shaft for rotation therewith, an eighth gear element and a ninth gear element operatively connected to the sixth and seventh gear element respectively and selectively operably connectable to the first countershaft, and a tenth and eleventh gear element operatively connected to the sixth and seventh gear element respectively and selectively operably connectable to the second countershaft;

wherein a first speed ratio is established between the first countershaft and the output shaft when the eighth gear element is operatively connected to the first countershaft, wherein a second speed ratio different from the first speed ratio is established between the first countershaft and the output shaft when the ninth gear element is operatively connected to the first countershaft; wherein a third speed ratio is established between the second countershaft and the output shaft when the tenth gear element is operatively connected to the second countershaft; and wherein a fourth speed ratio different from the third speed ratio is established between the output shaft and the second countershaft when the eleventh gear element is operatively connected to the second countershaft.

6. A vehicle transmission comprising:
a stationary member;
a differential gearset having first, second, third, fourth, and fifth coaxial gear elements operatively interconnected with one another;
an input shaft being operatively connected to the first gear element;
a first selectively engageable torque transmitting device mounted to the stationary member and operatively connected to the second gear element;
a second selectively engageable torque transmitting device mounted to the stationary member and operatively connected to the third gear element;
a first output member operatively connected to the fourth gear element;
a second output member operatively connected to the fifth gear element;
an output shaft; and
a third torque transmitting device selectively engageable to operatively connect the first output member to the output shaft; and a fourth torque transmitting device selectively engageable to operatively connect the second output member to the output shaft;
wherein the gearset is configured such that the rotational speeds of two of the gear elements may be independently established and determine the rotational speeds of the other three gear elements;
wherein the differential gearset includes a planet carrier, a first sun gear, a second sun gear, a first ring gear and a second ring gear; wherein the planet carrier is equipped with a first set of planet pinion gears which mesh with the first sun gear and first ring gear and a second set of planet pinion gears which mesh with the second sun gear and second ring gear; and wherein the first set of planet pinion gears meshes with the second set of planet pinion gears.

7. The transmission of claim 6 wherein the first gear element is the planet carrier, the second gear element is one of the sun gears, the third gear element is the other of the sun gears, the fourth gear element is one of the ring gears, and the fifth gear element is the other of the ring gears.

8. The transmission of claim 6, wherein the first torque transmitting device and the second torque transmitting device are electric motor/generators.

9. The transmission of claim 1, further comprising an energy storage device for accepting power from, and supplying power to, the first and second torque transmitting devices; and
a controller for regulating power flow among the energy storage device and the first and second torque transmitting devices.

10. The transmission of claim 6, further comprising a fifth torque transmitting device being selectively engageable to provide a direct-drive connection between the input shaft and the output shaft.

11. A vehicle transmission comprising:
a stationary member;
a differential gearset having a planet carrier, a first sun gear, a second sun gear, a first ring gear and a second ring gear; wherein the planet carrier is equipped with a first set of planet pinion gears which mesh with the first sun gear and first ring gear and a second set of planet pinion gears which mesh with the second sun gear and second ring gear; and wherein the first set of planet pinion gears meshes with the second set of planet pinion gears;
an input shaft being operatively connected to the planet carrier;
a first electric motor/generator mounted to the stationary member and operatively connected to first sun gear;
a second electric motor/generator mounted to the stationary member and operatively connected to the second sun gear;
an output shaft;
a first output member operatively connected to the first ring gear;
a second output member operatively connected to the second ring gear; and
a first torque transmitting device being selectively engageable to operatively connect the first output member to the output shaft; and a second torque transmitting device being selectively engageable to operatively connect the second output member to the output shaft.

12. The transmission of claim 11, further comprising an energy storage device for accepting power from, and supplying power to, the first and second electric motor/generators; and
a controller for regulating power flow among the energy storage device and the first and second motor/generators.

* * * * *